May 21, 1929.    L. L. NETTLETON    1,714,041
TRAIN SIGNAL DEVICE
Filed May 1, 1928
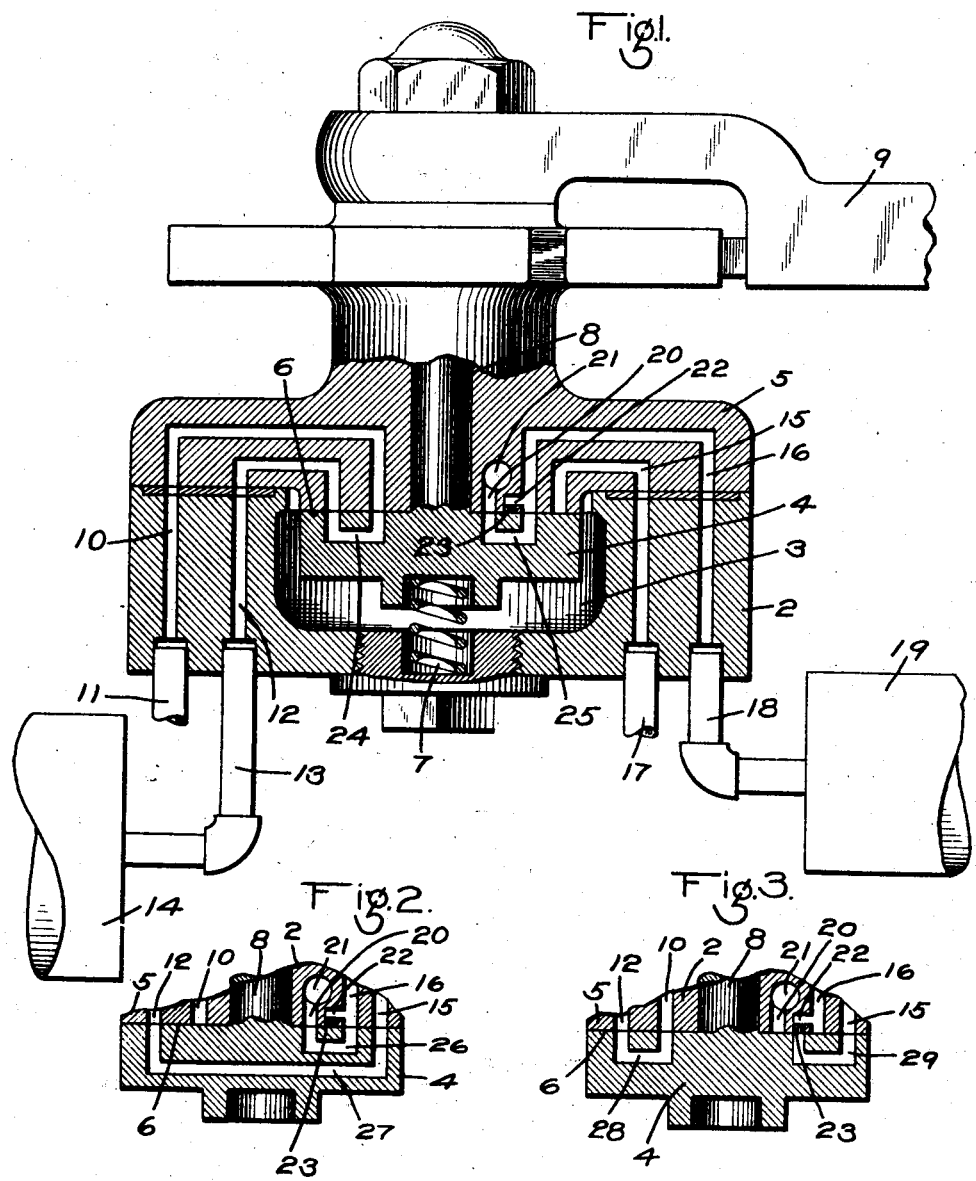
INVENTOR
LEWIS L. NETTLETON
BY Wm. N. Cady
ATTORNEY Patented May 21, 1929.

1,714,041

UNITED STATES PATENT OFFICE.

LEWIS L. NETTLETON, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

TRAIN SIGNAL DEVICE.

Application filed May 1, 1928. Serial No. 274,201.

This invention relates to train signaling devices and more particularly to means for signaling by fluid pressure from one end of a train to the other, such as from the caboose of a freight train to the cab of the locomotive.

An important object of the invention is to provide means for transmitting a wave through the brake pipe of a conventional fluid pressure brake system for signaling purposes.

Another object of the invention is to provide a signal system embodying a signal valve including means for increasing the pressure in a brake pipe of a fluid pressure brake system for creating a wave in one direction, when the valve is in one of its positions, and for decreasing the fluid pressure in the brake pipe for creating a wave in the brake pipe in the opposite direction, when the valve is in another one of its positions.

Other objects will appear as the description proceeds.

In the accompanying drawing; Fig. 1 is a vertical section through the valve showing the same incorporated in the signaling system, the valve being shown in its running position; Fig. 2 is a diagrammatic view in section, of a portion of the valve, showing the same in one of its operating positions; and Fig. 3 is a view similar to Figure 2, showing the valve in another one of its operating positions.

As shown in the drawings, the device may comprise a valve body 2 having a chamber 3 containing a rotary valve 4. A cover 5 is provided for the valve body 2 and the lower face of the cover is provided with a valve seat 6 for the rotary valve 4. A spring 7 may be employed for normally holding the valve 4 on its seat 6. The rotary valve 4 may be provided with a central stem 8, which extends through the cover 5 and a manipulating handle 9 can be secured to the stem for changing the position of the valve 4.

A passage 10 is formed in the body 3 and cover 5 and connects a fluid pressure supply pipe 11, which can lead from any suitable source of supply of fluid under a greater pressure than ordinary brake pipe pressure, with the valve seat 6. A similar passage 12 is formed in the body and cover and has communicating therewith a pipe 13 leading from a large reservoir 14. This passage 12 opens out, likewise, through the valve seat 6. Passages 15 and 16 are formed in the body and cover on the opposite side thereof from the passages 10 and 12 and also opens out through the valve seat 6. The passage 15 has communicating therewith the usual brake pipe 17 of a fluid pressure brake system, while the passage 16 has communicating therewith a pipe 18 leading to a small reservoir 19. A passage 20 connects the valve seat 6 with an atmospheric port 21. A small passage 22 is arranged at one side of the passage 16 and communicates therewith and opens out through the valve seat 6 and has disposed therein a choke 23 for a purpose, which will be latter described.

The upper face of the valve 4 is provided with spaced diametrically aligned cavities 24 and 25, which are adapted to connect the passages 10 and 12 together and the passages 16 and 20 together, when the valve 4 is in one of its positions, as shown in Figure 1 of the drawing. A relatively short cavity 26 and a relatively long cavity 27 are formed in the valve 5 and the cavity 26 is adapted to connect the passages 16 and 20 together, while the cavity 27 is adapted to connect passages 12 and 15 together, when the valve 4 is in another one of its positions, as shown in Figure 2 of the drawing. Spaced cavities 28 and 29 are also formed in the valve 4 and are adapted to connect passages 10 and 12 together and passages 16 and 22 together, when the valve is in another one of its positions, as shown in Figure 3 of the drawing.

The normal running position of the valve is shown in Figure 1 of the drawing, and in this position the supply pipe 11 is connected with the reservoir 14, for charging the same, through the medium of the passage 10, cavity 24, passage 12 and pipe 13, while the small reservoir 19 is connected with the atmosphere through the medium of pipe 18, passage 16, cavity 25, passage 20 and port 21.

When it is desired to send a wave through the brake pipe 17 for signaling purposes, the valve 4 is first turned to the position, shown in Figure 2. In this instance, the large reservoir 14 is connected with the brake pipe 17, through the medium of pipe 13, passage 12, cavity 27 and passage 15, which will allow fluid, under a relative high pressure and under a greater pressure than brake pipe pressure, to flow into the brake pipe 17 causing the transmission of a wave in the brake pipe. In this position of the valve plate 4, the small reservoir 19 is still connected with the atmosphere, through the medium of pipe 18, passage 16, cavity 26, passage 20 and port 21. The valve 4 may now be turned to the position shown in Figure 3 and in this instance, the brake pipe 17 is connected with the small reservoir 19, through the medium of passage 15, cavity 29, passage 22, choke 23, passage 16, and pipe 18. As the small reservoir 19 is empty, there will be a drop in the brake pipe pressure, causing the transmission of a wave in the brake pipe 17 in a direction opposite to the direction of transmission of the first wave. Due to the choke 23, the drop in brake pipe pressure will be small and insufficient to cause an application of the brakes. In this position of the valve plate 4, the supply pipe 11 is again connected with the large reservoir 14, to recharge the same, through the medium of passage 10, cavity 28, passage 12 and pipe 13. The valve 4 can be moved from one to the other of the positions shown in Figures 2 and 3 until the desired signals have been given, after which the valve can be returned to its running position, as shown in Figure 1.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. In a signaling system, the combination with a brake pipe of a fluid pressure brake system, of manually controlled means for first increasing the brake pipe pressure above the normal pressure and for then reducing the brake pipe pressure to thereby cause a pressure wave through the brake pipe for signaling purposes.

2. The method of utilizing the brake pipe of a fluid pressure brake system for signaling purposes which consists in alternately increasing and decreasing the brake pipe pressure to thereby produce an undulating pressure wave in the brake pipe.

3. The method of utilizing the brake pipe of a fluid pressure brake system for signaling purposes which consists in first connecting the brake pipe to a reservoir charged with fluid at a higher than normal brake pipe pressure and then to a reservoir at atmospheric pressure.

4. In a signaling system, the combination with a brake pipe of a fluid pressure brake system, of a reservoir normally charged with fluid in excess of the normal brake pipe pressure, a reservoir normally at atmospheric pressure, and manually operated valve means for connecting the charged reservoir to the brake pipe in one position and the other reservoir to the brake pipe in another position.

5. In a signaling system, the combination with a brake pipe of a fluid pressure brake system, of two reservoirs, and manually operated valve means having one position for conencting one reservoir to a source of fluid under pressure, another position in which said charged reservoir is connected to the brake pipe and the other reservoir to the atmosphere, and a third position in which the atmospheric reservoir is connected to the brake pipe.

6. In a signaling system, the combination with a brake pipe of a fluid pressure brake system, of two reservoirs, and manually operated valve means having one position for connecting one reservoir to a source of fluid under pressure and the other reservoir to the atmosphere, another position in which the charged reservoir is connected to the brake pipe, and a third position in which the charged reservoir is connected to the source of fluid under pressure and the other reservoir to the brake pipe.

In testimony whereof I have hereunto set my hand.

LEWIS L. NETTLETON.